United States Patent
Hannan

(10) Patent No.: US 6,189,764 B1
(45) Date of Patent: Feb. 20, 2001

(54) FITTING GEAR

(76) Inventor: Dale Hannan, 1153 Red Bank Ave., Thorofare, NJ (US) 08086

(*) Notice: Under 35 U.S.C. 154(b), the term of this patent shall be extended for 0 days.

(21) Appl. No.: 09/236,382

(22) Filed: Jan. 25, 1999

(51) Int. Cl.⁷ .............. B23K 37/00; B23K 1/14; B23K 37/04; B23K 5/22; B23K 31/02
(52) U.S. Cl. .......... 228/44.3; 228/44.7; 228/49.4; 228/212
(58) Field of Search .................. 228/212, 44.3, 228/49.4, 44.7

(56) References Cited

U.S. PATENT DOCUMENTS

| | | | |
|---|---|---|---|
| 3,582,609 | 6/1971 | Morley et al. | 219/161 |
| 3,618,844 * | 11/1971 | Morley et al. | 228/4 |
| 3,650,457 * | 3/1972 | Fiegel, Jr. et al. | 228/44 |
| 3,701,881 | 10/1972 | Rother et al. | 219/123 |
| 3,715,070 * | 2/1973 | Shibata | 228/44 |
| 4,143,801 | 3/1979 | Sargent | 228/17.5 |
| 4,550,244 | 10/1985 | West et al. | 219/158 |
| 4,618,089 | 10/1986 | Hanada et al. | 228/212 |
| 4,631,809 * | 12/1986 | Yokoi | 29/607 |
| 5,023,427 | 6/1991 | Neiheisel et al. | 219/121 |
| 5,229,571 | 7/1993 | Neiheisel | 219/121 |
| 5,234,154 * | 8/1993 | Kajiwara et al. | 228/158 |
| 5,261,589 * | 11/1993 | Williams | 228/3.1 |
| 5,454,480 | 10/1995 | Morris | 220/4.14 |
| 5,464,147 * | 11/1995 | Minami | 228/212 |
| 5,626,776 | 5/1997 | Morris, Jr. | 219/121 |
| 5,630,269 | 5/1997 | Wasserbaech et al. | 29/559 |
| 5,688,414 | 11/1997 | Kondo | 219/98 |
| 5,878,944 * | 3/1999 | Aebersold et al. | 228/212 |
| 6,053,392 * | 4/2000 | Aebersold et al. | 228/5.7 |

* cited by examiner

Primary Examiner—Patrick Ryan
Assistant Examiner—Zidia T. Pittman
(74) Attorney, Agent, or Firm—Norman E. Lehrer

(57) ABSTRACT

A fitting gear for assisting in the alignment of metal plates so that the edges thereof can be welded together includes an inverted substantially U-shaped electromagnet which, when energized, is adapted to be secured to the upper surface of one of the plates adjacent on edge thereof. A wedge-shaped tapered pin is forced into the U and contacts the upper surface of the other plate to move the edges into substantial alignment with each other.

6 Claims, 2 Drawing Sheets

FITTING GEAR

BACKGROUND OF THE INVENTION

The present invention is directed toward a fitting gear and more particularly toward a fitting gear in the form of an electromagnetic U-bar which is intended to assist in the alignment of two metal plates so that the edges thereof can be welded together.

It is frequently desirable to weld plates together along their edges. This is done, for example, when constructing the outer shell or covering the outer surface of a large tank or building or other structure. These steel plates may have, for example, a thickness between 3/16 and 1/4 of an inch although the invention described herein may be applicable to plates that are thinner or thicker than these.

The steel plates may be welded together utilizing either a lap welding technique or a butt welding technique. In lap welding, the edges of the steel plates overlap each other by a small amount such as an inch or so and the outermost extreme edge of the upper plate is welded to the upper surface of the underlying plate adjacent its edge. When utilizing a butt welding technique, the extreme edges of the two plates are place adjacent to each other with the plates lying in the same plane and the extreme edges of each of the plates are then welded to each other.

When employing either the lap welding or butt welding technique, it is necessary for the edges of the two plates to be in alignment with each other in order to effectuate a good weld from both a mechanical and aesthetic standpoint. That is, if the edges of the plates are not in direct contact with each, they cannot be uniformly welded along their length.

Two plates frequently do not perfectly align with each other due to imperfections in the plates. That is, the edge of one plate may be slightly bent along its length thereof with respect to the other or may have minor undulations or waves. It is, therefore, necessary to flatten the two edges of the adjacent plates with respect to each other so that they are in proper alignment for welding.

FIGS. 1 and 3 of the enclosed drawings illustrate one method currently used to facilitate the alignment of the edges of two metal plates for welding. The prior art fitting gear 10 shown in FIGS. 1 and 3 is comprised essentially of a plurality of inverted U-shaped bolts 12 which cooperate with a like number of tapered bull pins 14 or the like. Each of the U-bolts 12 is welded to the upper surface 16 of one of the plates 18 adjacent edge 20 thereof. These are welded in a conventional manner utilizing any known technique and the weld lines are clearly shown at 22 in FIGS. 1 and 3. The leading edge 24 of the second plate 26 is then placed over the edge 16 of the first plate 18. Pins 14 are then forced through the U-bolts so as to force the edges of the two plates together. Since the pins 14 are elongated and tapered, the edges of the two plates are essentially cammed together as the pins engage the upper portion of the bolts 12 and the upper surface of the forward edge 24 of the plate 26.

The number of U-bolts 12 that may be required depends on the thickness of the plates 18 and 26 and the amount of curvature or wave that prevents the plates from coming into contact with each other. It may sometimes be necessary to use a large number of U-bolts 12 spaced only a few inches from each other or it may be necessary to utilize only a few such bolts placed several feet apart from each other. In any event, once the bolts 12 and pins 14 are in place and the plates are in contact with each other, the edges of the plates are welded together, again, utilizing any known welding technique.

After the plates have been welded together, the U-bolts 12 must then be removed. This is normally done by simply breaking the U-bolts off or dewelding them by again providing the necessary heat or electrical energy in order to destroy the welds. In either event, however, the previous weld spots must either be removed or present cosmetically unappealing appearances. Either choice is clearly non-desirable.

Applicant is also aware of the fact that electromagnetic energy has been utilized to assist in the alignment of metal parts so that they can be joined together. Complex arrangements for accomplishing the same are shown, for example, in U.S. Pat. Nos. 3,582,609; 3,618,844; 3,701,881 and 5,203,427. To Applicant's knowledge, no one has considered utilizing electromagnetic forces in the manner proposed in the present application.

SUMMARY OF THE INVENTION

The present invention is designed to overcome the deficiencies of the prior art discussed above and is directed toward a fitting gear which has the advantages of the welded U-bars described above without the accompanying disadvantages. The fitting gear of the present invention which is utilized for assisting in the alignment of metal plates so that the edges thereof can be welded together includes a number of inverted substantially U-shaped electromagnets. When these electromagnets are energized, they are adapted to be secured to the upper surface of one of the plates adjacent and edge thereof. A bull pin or other wedge-shaped implement is then forced into the U-shaped electromagnet and contacts the upper surface of the other plate to move the edges into substantial alignment with each other. After the edges of the plates are welded together, the electromagnets are de-energized and removed with the surface of the plates being unmarred.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
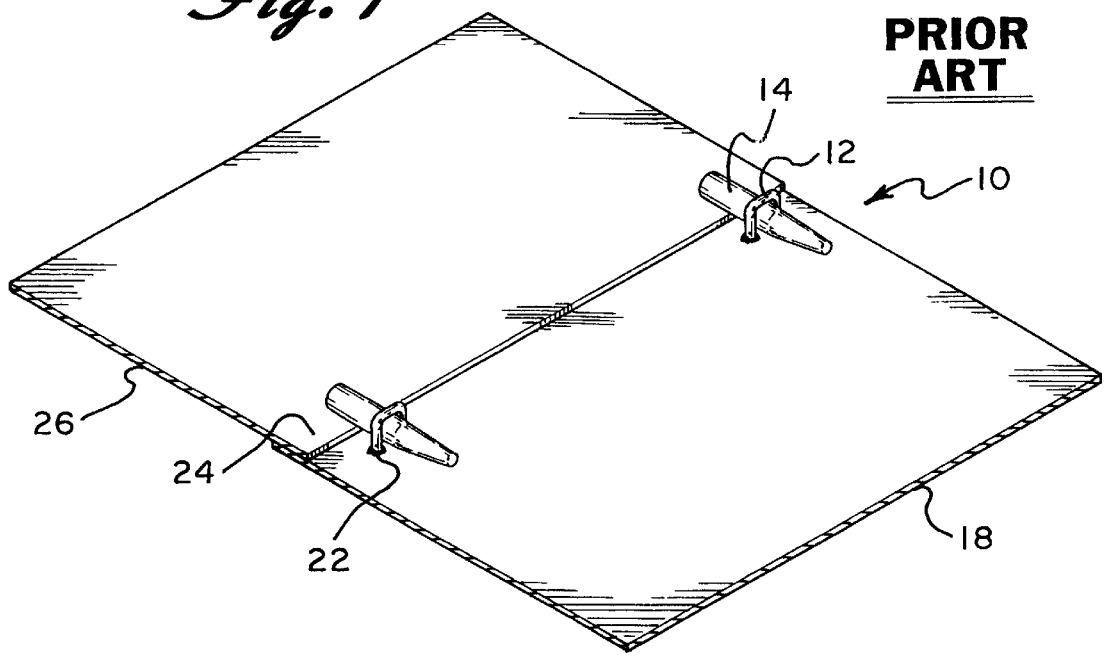
FIG. 1 is a top perspective view showing a prior art method for securing the edges of two plates together for welding.
Figure 3:
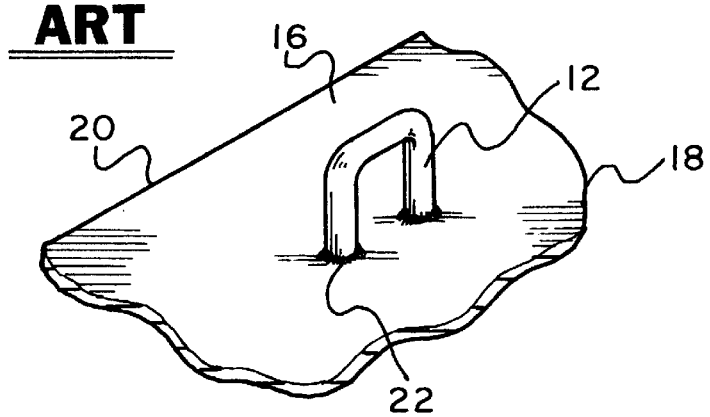
FIG. 3 is a perspective view of a U-bar welded to a plate in accordance with the prior art.

Referring now to the drawings in detail wherein like reference numerals have been used throughout the various figures to designate like elements, there is shown in FIGS. 1 and 3, a fitting gear system in accordance with the prior art which is utilized to align the edges of metal plates together so that the same can be welded. This prior art system is described above in the section of this application entitled Background of the Invention.

Figure 2:
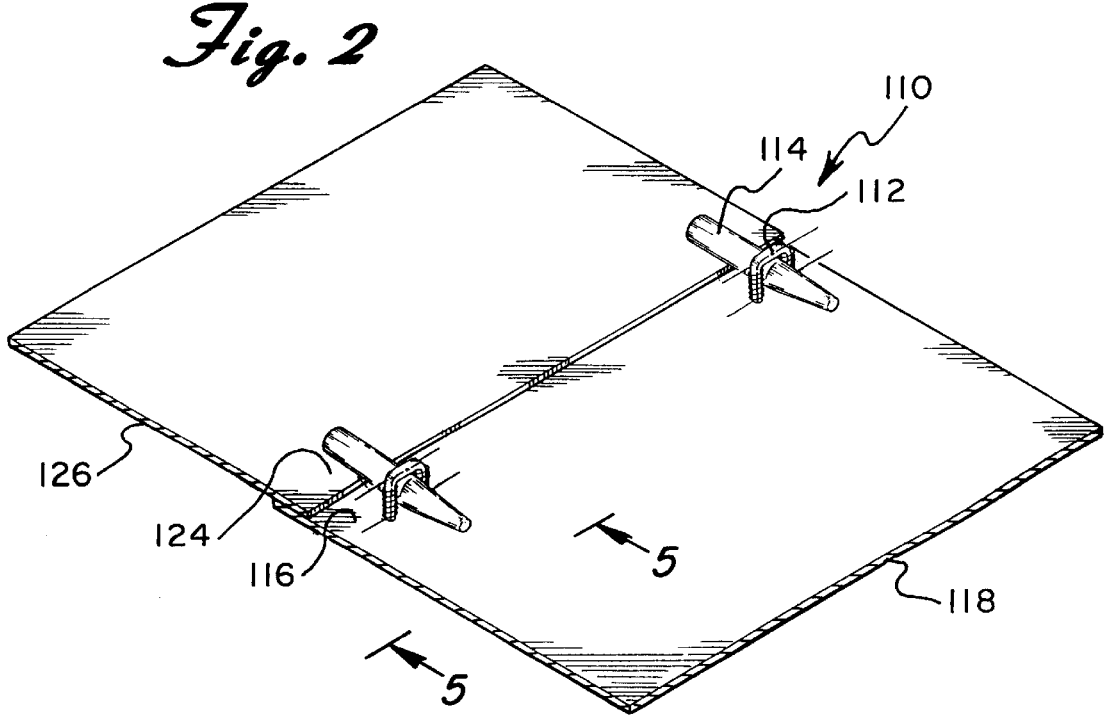
FIG. 2 is a view similar to FIG. 1 showing the improved system of the present invention.
Figure 4:
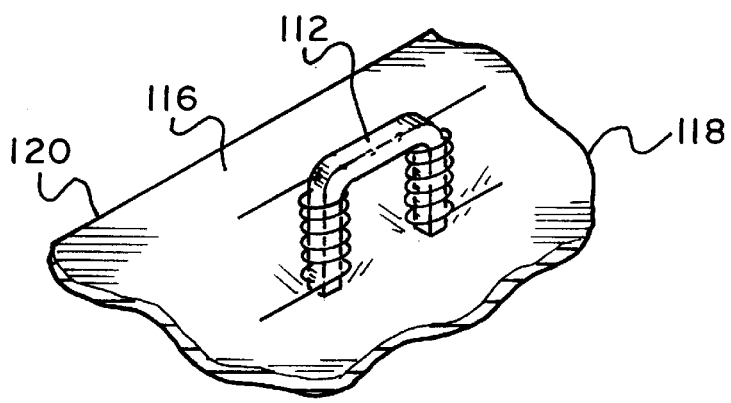
FIG. 4 is a view similar to FIG. 3 showing the use of a U-bar in accordance with the present invention.
Figure 5:
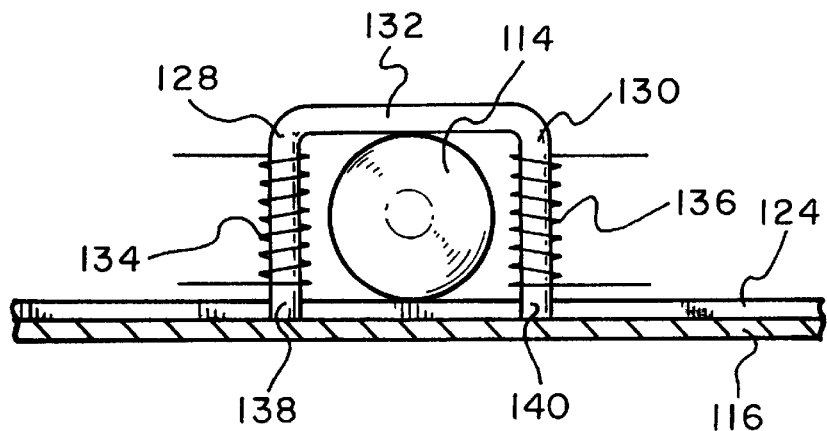
FIG. 5 is a cross-sectional view taken through the line 5—5 of FIG. 2.

FIGS. 2, 4 and 5 illustrate the improved fitting gear system of the present invention. For convenience, the elements of FIG. 2 have been numbered similar to like elements shown in FIGS. 1 and 3. However, in order to differentiate the inventive elements from the prior art, FIGS. 2, 4 and 5 utilize numbers in the 100 series. That is, for example, while the U-bar 12 of FIGS. 1 and 3 is designated by number 12, the electromagnetic U-bolts of FIGS. 2, 4 and 5 are designated as element 112.

With reference first to FIG. 2, it can be seen that the fitting gear of the present invention which is generally illustrated at 110 is somewhat similar and is used in a manner similar to the prior art system 10 shown in FIG. 1. The inventive fitting gear system also utilizes a plurality of fixture members 112 and a plurality of elongated wedge-shaped members 114 which are preferably in the form of bull pins. Each fixture member is secured (in a manner to be described in more detail hereinafter) to the upper surface 116 of a first plate 118 adjacent an edge thereof. The leading edge 124 of the second plate 126 is then placed over the top of the surface 116 and the bull pins 114 are inserted into the fixture members 112 so as to force the edges of the plates into contact with each other so that the same can welded together. That is, the fitting gear of the present invention is utilized in a manner very similar to the fitting gear of the prior art described above and performs essentially the same function.

As shown most clearly in FIGS. 4 and 5, each of the electromagnetic U-bolts or fixture members 112 of the invention includes first and second vertically extending legs or sections 128 and 130. Extending between the uppermost parts of the vertical sections 128 and 130 is a horizontally extending section 132. In the preferred embodiment of the invention, the entire fixture member 112 may be made of a single piece of ferro-magnetic material such as iron or the like. Alternatively, the vertical sections 128 and 130 and the horizontal section 132 could be made of individual elements that are secured together.

At least one and preferably both of the vertically extending sections 128 and 130 includes an electrical coil such as shown at 134 and 136 wrapped therearound. As is well known, when electrical current passes through the coils 134 and 136, i.e. when the coils are energized, an electromagnet is created. As a result of these magnetic forces, the lower most ends 138 and 140 of the vertical sections 128 and 130 are drawn toward and are secured to the upper surface 116 of the plate 118. Obviously this will occur only if the metal plate 118 is also made of a ferro-magnetic material. That is, the plate 118 must be made of a material to which a magnet is attracted. After the plurality of fixture members 112 are secured to the upper surface 116 of the plate 118, the elongated wedge-shaped members or bull pins 114 are inserted as described above. After the two plates 118 and 126 have been welded together, the pins 114 can be removed. The electromagnetic fixture members 112 are easily removed from the plate 118 by simply deenergizing the coils 134 and 136. With the coils deenergized, the fixture members 112 no longer function as electromagnets and are easily removed from the plate 118 leaving no marring of the surface thereof.

The present invention may be embodied in other specific forms without departing from the spirit or essential attributes thereof and accordingly, reference should be made to the appended claims rather than to the foregoing specification as indicating the scope of the invention.

I claim:

1. A fitting gear for assisting in the alignment of first and second ferromagnetic plates so that the edges of said plates can be welded together, each of said plates having an upper surface and a lower surface, said fitting gear comprising:

a fixture member, said fixture member having a substantially vertically extending section and a substantially horizontally extending section;

an electromagnetic coil associated with at least one of said sections;

means for energizing said coil so that said vertically extending section is secured to the upper surface of said first plate adjacent the edge thereof with said horizontal section spaced from said surface, and an elongated wedge member, said wedge member being adapted to be forced between said horizontal section of said fixture member and the upper surface of said second plate adjacent the edge thereof so as to move said first and second plates into alignment with each other.

2. The fitting gear as claimed in claim 1 wherein said fixture member includes two vertically extending sections spaced apart from each other.

3. The fitting gear as claimed in claim 2 wherein said horizontal section extends between said vertical sections.

4. The fitting gear as claimed in claim 3 wherein said wedge member fits between said vertical sections.

5. The fitting gear as claimed in claim 4 wherein said fixture member is in the form of an inverted U.

6. The fitting gear as claimed in claim 1 wherein said wedge member is in the form of a tapered pin.

* * * * *